US011455978B2

(12) United States Patent
Tschiersch et al.

(10) Patent No.: US 11,455,978 B2
(45) Date of Patent: Sep. 27, 2022

(54) SOUND-ABSORBING CONSTRUCTION COMPONENT HAVING EXTINGUISHING PROFILES AND SOUND PROTECTION WALL

(71) Applicant: LIAVER GMBH & CO. KG, Ilmenau (DE)

(72) Inventors: Ronald Tschiersch, Stützerbach (DE); Christian Hoppe, Erfurt (DE)

(73) Assignee: LIAVER GMBH & CO. KG, Ilmenau (DE)

( * ) Notice: Subject to any disclaimer, the term of this patent is extended or adjusted under 35 U.S.C. 154(b) by 449 days.

(21) Appl. No.: 16/468,721

(22) PCT Filed: Dec. 13, 2017

(86) PCT No.: PCT/EP2017/082596
§ 371 (c)(1),
(2) Date: Jun. 12, 2019

(87) PCT Pub. No.: WO2018/114522
PCT Pub. Date: Jun. 28, 2018

(65) Prior Publication Data

US 2019/0348018 A1 Nov. 14, 2019

(30) Foreign Application Priority Data

Dec. 19, 2016 (DE) ..................... 10 2016 124 755.3

(51) Int. Cl.
*E04B 1/86* (2006.01)
*G10K 11/16* (2006.01)
(Continued)

(52) U.S. Cl.
CPC ............ *G10K 11/16* (2013.01); *E01F 8/0029* (2013.01); *E04B 2001/8461* (2013.01)

(58) Field of Classification Search
CPC .... G10K 11/16; G10K 11/162; G10K 11/165; E01F 8/0029; E01F 8/007; E01F 8/0058;
(Continued)

(56) References Cited

U.S. PATENT DOCUMENTS 4,600,078 A * 7/1986 Wirt ...................... E04B 1/8409 181/286
5,905,234 A * 5/1999 Tsukamoto ............ G10K 11/16 181/286
(Continued)

FOREIGN PATENT DOCUMENTS

DE 2524906 A1 12/1976
DE 4231487 A1 * 3/1994 ............ E01F 8/0029
(Continued)

*Primary Examiner* — Edgardo San Martin
(74) *Attorney, Agent, or Firm* — Stuart H. Mayer; Mayer & Williams PC

(57) ABSTRACT

The invention relates to a sound-absorbing construction component, which is suitable inter alia for use outdoors. The construction element comprises a sound-absorbing absorber layer having a sound entry surface and a plurality of extinguishing profiles fully enclosed in the absorber layer and arranged at a distance from one another. The extinguishing profile consists of a sound-reflecting material and has a profile inner space, which has one open side facing away from the sound entry surface. The extinguishing profile preferably comprises at least one inlet surface having numerous sound inlet openings and at least one closed reflection surface connecting to the inlet surface, wherein the reflection surface and the open side of the extinguishing profile are at a greater distance from the sound entry surface than the inlet surface. The profile inner space is hollow or completely or partially filled with the material of the absorber layer. The invention also relates to a sound protection wall having a backing layer on which numerous sound-absorbing construction components are arranged.

10 Claims, 5 Drawing Sheets

(51) Int. Cl.
*E01F 8/00* (2006.01)
*E04B 1/84* (2006.01)

(58) Field of Classification Search
CPC .. E01F 8/0082; E01F 8/00; E04B 2001/8461; E04B 2001/8423; E04B 2001/8428; E04B 2001/8476; E04B 2001/848; E04B 1/86
See application file for complete search history.

(56) References Cited

U.S. PATENT DOCUMENTS

| | | | | |
|---|---|---|---|---|
| 6,021,612 | A | 2/2000 | Dunn et al. | |
| 6,568,135 | B1 * | 5/2003 | Yokoyama | E01F 8/0094 52/145 |
| 9,538,267 | B2 * | 1/2017 | Barnas | E01F 8/0029 |
| 9,818,393 | B2 * | 11/2017 | Lagarrigue | G10K 11/172 |
| 2006/0260870 | A1 * | 11/2006 | Nakagawa | E04B 9/34 181/295 |
| 2012/0247867 | A1 * | 10/2012 | Yang | G10K 11/172 181/211 |

FOREIGN PATENT DOCUMENTS

| | | | | |
|---|---|---|---|---|
| DE | 19712835 | C3 * | 5/2002 | C04B 38/08 |
| DE | 102014015084 | A1 * | 4/2016 | B64D 11/02 |
| DE | 102015109808 | A1 * | 12/2016 | E01F 8/0029 |
| EP | 0417049 | A1 * | 3/1991 | E04C 2/52 |
| EP | 0417049 | B1 | 2/1993 | |
| EP | 0548856 | A1 * | 6/1993 | E01F 8/0023 |
| EP | 1508650 | A2 * | 2/2005 | E01F 8/0029 |
| FR | 2724401 | A1 * | 3/1996 | E01F 8/0029 |
| FR | 2877483 | A1 * | 5/2006 | G10K 11/162 |
| JP | H1046525 | A * | 2/1998 | E01F 8/00 |
| RU | 2656438 | C1 * | 6/2018 | |
| RU | 2659925 | C1 * | 7/2018 | |
| WO | WO 08/02640 | | 6/1985 | |
| WO | WO-8502640 | A1 * | 6/1985 | E06B 3/6707 |
| WO | WO-03008711 | A1 * | 1/2003 | E01F 8/0029 |
| WO | WO-2011098156 | A1 * | 8/2011 | F24D 3/14 |
| WO | WO 2016/203057 | | 12/2016 | |

* cited by examiner

SOUND-ABSORBING CONSTRUCTION COMPONENT HAVING EXTINGUISHING PROFILES AND SOUND PROTECTION WALL

BACKGROUND OF THE INVENTION

The present invention relates to a sound-absorbing construction component, which preferably has a basic sheet-type shape but can also be manufactured in other shapes. The sound-absorbing construction component comprises an absorbent layer as well as sound-proofing profiles, which are incorporated into the absorbent layer and are completely enclosed in the material of the absorbent layer and also affect the acoustic properties of the construction component and contribute toward an increase in the absorption effect in a particularly surprising manner.

With an increase in noise pollution especially in the vicinity of traffic routes, there has been a substantial increase in the demand for erecting acoustic walls in the outdoor area in recent years. However, sound-absorbing construction components are needed not only at roads and rail lines but also in commercial regions with greater noise pollution, for example. An acoustic goal here is to achieve the most extensive possible absorption of sound or noise over a wide frequency range. The sound-absorbing construction components used in the outdoor area must also be weather resistant for a long period of time and must also meet mechanical demands that may result from high wind speeds or possible attacks of vandalism, for example. Today there are actually no available materials with both great mechanical strength and resistance to environmental influences plus a high degree of sound absorption over a wide frequency range.

The principles of the absorption properties to be implemented in acoustic walls are described by W. Scholl: "Entwicklung und Anwendung von Lärmschutzwänden" [Development and Use of Acoustic Walls], Fraunhofer Institute of Structural Physics, IBP-Mitteilung 234, 20 (1993).

EP 0 417 049 A1 discloses a sheet component for an acoustic wall, which is made up of a plurality of layers of material. A backing layer here is formed by wooden boards joined together with a continuous layer of rock wool or a comparable fiber material applied to the wooden boards in the direction of the sound source. This sound-absorbing layer is covered over the entire surface by another layer of a cement-bonded porous material. Such sheet components have a high cost of materials and cost of production. The sheet component must have a great total thickness chosen if effective absorption properties are to be achieved. On the whole, this sheet component has suitable absorption properties only in certain frequency ranges because essential frequency ranges are either already reflected on the continuous top layer or cannot be adequately absorbed by the enclosed layer of rock wool, so that there is unwanted reflection of sound on the rear wooden wall. The enclosed rock wool is also sensitive to moisture, so that the sheet components must either be sealed in an expensive manner or the sound-absorbing properties will subside over a period of time.

EP 1 508 650 B1 discloses a method for production of an acoustic wall from sound-absorbing construction components. One embodiment of the construction component produced in this way has a backing sheet made of concrete on which facing shells are mounted on one or two sides, wherein the facing shells contain sintered, expanded glass. Although sintered expanded glass basically has good weather resistance, it is highly susceptible to mechanical stresses. The facing shell of sintered, expanded glass on the outside of the sound-absorbing construction component is therefore damaged by even moderate mechanical stress, such as that which can also occur in the assembly process.

DE 197 12 835 C3 discloses a molded body made of a lightweight material having sound-absorbing properties.

EP 0 548 856 B1 discloses a privacy wall and acoustic wall having a supporting construction. In a specific embodiment, highly profiled sound-absorbing profiles are mounted on a concrete supporting wall. The sound-absorbing profiles are made of porous lean concrete and have individual cavities, some of which protrude into the layer of lean concrete of the sound-absorbing profiles. To improve the sound-absorbing effect, these cavities may be filled with rock wool. One disadvantage of this arrangement is the substantial profiling of the outward facing surface of the sound-absorbing profile, which makes it impossible to use this material in areas of high winds, for example, in the immediate vicinity of high-speed train lines, despite the fact that it results in improved absorption properties. This also leads to a great total thickness of the wall and to a high weight.

DE 42 31 487 A1 discloses an acoustic wall component having a backing layer of concrete. A large area recess is incorporated into the backing layer, so that a top layer of individual sheet-shaped components consisting of porous concrete incorporated into the recess to cover the entire area. These porous concrete slabs improve the absorption properties, while the mechanical stability of the backing layer behind them is worsened. To further improve the sound absorption, sound-absorbing slabs designed to cover an area are arranged between the porous concrete elements and the backing layer. The intermediate sound-absorbing slabs fill up essentially the entire area of the recess apart from minor exposed regions at the edges of the individual porous concrete slabs.

DE 25 24 906 A1 describes a protective wall to protect against noise emissions. The safety wall includes a supporting reinforced steel concrete wall, which provides sound-absorbing properties at the same time, and an absorbent layer, these being joined to one another by adhesive bonding or needling. The absorbent layer consists of open-pore slabs of plastic-bonded elastomer fibers reinforced with woven inserts. The steel-reinforced concrete wall has profiling with grooves in the borderline area with the absorbent layer. The grooves may be filled partially or completely with a secondary absorbent material. Alternatively, the absorbent material may also be applied only as a coating in the grooves. Fine-pore and open-pore foams, preferably formulated to be soft, are suitable as the secondary absorption materials.

In the subsequently published International Patent Application WO 2016/203057 A1 by the same applicant, a sound-absorbing construction component, which is also suitable for the outdoor field, is described. This construction component comprises a sound-absorbing cover layer, which has an increased degree of absorption in comparison with the cover layer, as well as sound-absorbing components incorporated into it. The surface of the cover layer facing in the direction of the sound source is designed to be flat, the sound-absorbing components are spaced a distance apart from one another, and the absorption surface of the sound-absorbing components lies in a plane parallel to the cover layer. The area taken up by the sound-absorbing components in this plane is smaller than the area not taken up by the sound-absorbing components. The material of the sound-absorbing components that absorbs sound well is expensive, so that the total cost of the construction component will always be relatively high, although it is much more favorable in comparison with older arrangements. Furthermore, incorporation of the sound-absorbing components is technologically demanding.

SUMMARY OF THE INVENTION

One object of the present invention thus consists of providing a sound-absorbing construction component that has been even further improved against the background of the prior art cited above and which can be produced economically and easily in particular. The construction component should preferably meet the requirements for use in the outdoor field and given the environmental influences and use conditions prevailing there while nevertheless having a significantly improved degree of absorption in comparison with previous approaches, in particular in the frequency range between 250 and 2000 Hz in order to be able to use the sound-absorbing component efficiently in noise abatement. Another object of the present invention is seen as providing an improved acoustic wall.

This object is achieved by a sound-absorbing construction component according to the accompanying claim 1 and/or by an acoustic wall according to the other independent claim 10.

The present invention is based on the surprising finding that sound absorption by an absorbent layer can be improved significantly by inserting molded profiles made of a hard material, which is not sound absorbent per se, but has numerous sound inlet openings incorporated into the absorbent layer. The improvement in absorption is especially noteworthy, in particular in absorbent layers made of simple materials with a relatively poor absorption. It is then possible to eliminate the step of filling the profiles, hereinafter referred to as sound-proofing profiles, with an expensive material that has a better sound-absorbing effect than the absorbent layer—as is known from the state of the art. Eliminating this step can be eliminated means that the sound-proofing profile either has a cavity or is filled with the material of the absorbent layer. The phenomenon on which the present invention is based can be explained by the fact that the sound waves are reflected, diffracted and superimposed at the edges of the profiles and in the interior of the profiles, ultimately resulting in full absorption of the sound energy. Due to the use of such sound-proofing profiles, the resulting travel distances of sound waves in the absorbent material can be prolonged significantly, which also improves the absorption effect.

The sound-absorbing construction component according to the invention has a sound-absorbing layer with a sound inlet surface and a plurality of sound-proofing profiles that are arranged with a distance between them and are completely enclosed in the absorbent layer. Each sound-proofing profile consists of a sound reflecting material, for example, steel plat, aluminum or plastic, and delineates a partially open profile interior having one side that is open and faces away from the sound inlet surface. The profile interior is hollow or is completely or partially filled with the material of the absorbent layer.

The sound-proofing profile preferably has at least one inlet surface having a plurality of sound inlet openings and at least one closed reflective surface connected to the inlet surface. The sound inlet openings may preferably be distributed regularly or irregularly in the inlet surface. The reflective surface and the open side of the sound-proofing profile are spaced a greater distance apart from the sound inlet surface of the absorbent layer than the inlet surface. The reflective surface may run at a right angle to the sound inlet surface or parallel to it or at an acute or obtuse angle. The goal at any rate is to make the distance travelled by the reflected sound waves as long as possible in the absorbent material.

In a preferred embodiment, the inlet surface of the sound-proofing profile is arranged at a distance from and parallel to the sound inlet surface. Advantageous modifications instead use inlet surfaces running at an angle to the sound inlet surface, in particular at an angle of 45° to the sound inlet surface. Reflective surfaces running at an angle to the inlet surface are preferably attached at both ends.

An expedient embodiment of the sound-absorbing construction component is characterized in that the surface of all sound-proofing profiles projected onto the sound inlet surface is smaller than the surface proportion of the sound inlet surface not taken up by the projected surface. In alternative embodiments, these surfaces are in approximately the same ratio or an inverted ratio, wherein the resulting absorption properties also depend on the respective material used in the absorbent layer.

According to a particularly preferred embodiment, the sound-proofing profile has at least one collar surface running parallel or at an angle to the sound inlet surface and extending outside of the interior of the profile. The collar surface may run at an obtuse angle or at an acute angle to the sound inlet surface. The collar surface also has acoustic effects and results in a lengthening of the travel distance (and thus the transit time) of the reflected sound waves in the absorbent material due to reflections on the collar surface. The collar surface also serves to assist in positioning of the sound-proofing profile in the manufacturing process. Finally the collar surface can improve the static properties of the sound-absorbing construction component so that its mechanical stability increases.

It is advantageous if the open side of the sound-proofing profiles is at a greater distance away from the sound inlet surface than from the rear side of the absorbent layer opposite the sound inlet surface. The distance of the sound inlet surface of the profiles from the rear side of the absorbent layer is preferably between 10 and 30 mm, especially preferably between 15 and 25 mm.

Advantageous embodiments of the sound-absorbing component use sound-proofing profiles with a U-shaped, V-shaped, hat-shaped or truncated pyramid-shaped cross section. Other cross-sectional shapes are also possible.

The sound inlet openings on the inlet surface are preferably designed as perforations, i.e., the openings are distributed uniformly over the inlet surface wherein the sound inlet openings preferably take up 5% to 20% of the surface of the inlet surface. The sound inlet openings preferably have a circular shape with an opening diameter between 6 and 10 mm. Alternatively, however, elongated slots with edge lengths in the range of (5-10)×(10-30) mm or other shapes may also be used for the sound inlet openings.

A preferred design of the sound-absorbing construction component uses an absorbent layer with a thickness of 40 to 80 mm, preferably 50 to 70 mm, in particular 60 mm. The absorbent layer preferably consists of a porous absorbent layer, in particular expanded glass, expanded clay, pumice, crushed rock, wood concrete, mineral fibers or a mixture of these materials. The materials may be held together by a binder, for example, cement, polyurethane, epoxy resins or others. The absorbent layer is preferably a porous absorbent material consisting preferably of porous material.

The interior of the profile of the sound-proofing profile expediently has a cross-sectional area between 600 and 3000 $mm^2$. It is particularly advantageous if the sound-proofing profiles have a height that extends in the thickness of the absorbent layer and is greater than its width, which then results in particularly good absorption results when the absorbent layer has a thickness of more than 60 mm.

A preferred embodiment is characterized in that the sound inlet surface of the absorbent layer is designed to be flat.

The finding that interfacial acoustic effects that facilitate the absorption effect occur at the interfaces between absorbent materials and reflective materials is important for the present invention. Sound wave diffraction, phase shifts, superimposing of sound waves and absorption occur for greater distances traveled in particular by utilizing these effects, higher absorption values, a more broad-band absorption and an increase in absorption in the low frequency range can be achieved in a targeted manner. Such interfaces exist between successive layers of different materials (air-absorbent layer in the sound-proofing profile) and along the aforementioned diffraction edges of sound-proofing profiles incorporated into an absorbent layer.

At the boundary lines between an absorbent material and a non-absorbent or reflective material, diffraction of the sound waves impinging there occurs in particular, the diffracted sound wave component being superimposed on the sound waves to be absorbed to achieve a partial extinction of the sound waves or in the best case complete extinction, resulting in a definite increase in the absorption rate. Such boundary lines are referred to below as diffraction edges.

The sound-proofing profile consists of a sound-reflecting material. The sound waves which have first traveled a distance in the absorbent layer penetrate into the sound-proofing profile through the numerous sound inlet openings in the sound inlet surface and/or through the open side of the profile facing away from the sound inlet surface after being reflected at the interface with the backing layer. In addition sound reflection also occurs between the profiles due to the numerous sound-proofing profiles running preferably parallel to one another and side-by-side. The diffraction edges referenced above are formed especially effectively at the interfaces between the absorbent layer and the sound-proofing profile.

Smooth, thin weather-resistant, high-impact sound-absorbing construction components can thus be produced with the design according to the invention using inexpensive materials as the absorbent layer and inexpensive sound-proofing profiles without having to use any expensive and sensitive, highly absorbent materials. The construction components according to the invention can thus be used to particular advantage for sound absorption on stretches of railway line, for example, where there is usually very little available clearance distance from high-speed trains, so that strong eddies of air and a high level of noise pollution occur. The sound absorbent construction components according to the invention are also suitable for subsequent implementation of sound abatement measures in and on building constructions that were not originally optimized with respect to sound absorption.

An advantageous specific embodiment is characterized in that the sound-absorbing layer has a degree of absorption $\alpha$=0.3 to 0.75.

The sound-proofing profile especially preferably have an area amounting to 30% to 70% in the absorbent layer and have a height amounting to 25% to 80% of the thickness of the absorbent layer. In addition, it is essential for the invention that the individual sound-proofing profiles are arranged at a distance from one another so that as many of the aforementioned diffraction edges and reflective surfaces are formed as possible.

A particularly preferred specific embodiment uses sound-proofing profiles that cover an area of approx. 50% of the area of the absorbent layer. It has proven expedient to use U-shaped sound-proofing profiles with a width of approx. 30 to 60 mm, which have a collar area with a width of 15 to 25 mm on both edges and maintain an axial distance from one another of 200 to 350 mm. This results in an optimized absorption rate at frequencies in the range between 250 and 2000 Hz. This design leads to a targeted improvement in the absorption rate specifically for requirements in train traffic (cf. Guidelines for Noise Abatement Systems at Railway Tracks—RLE, for example).

It has been found that greater distances between the sound-proofing profiles will result in an improved absorption in the higher frequency range so that the sound-absorbing construction component can be adapted to a preferred spectrum to be absorbed in this way. This leads to a targeted broadband improvement in the range of 500 to 3000 Hz for the requirement "highly absorbent" in street traffic (cf. Additional Technical Regulations and Guidelines for Implementation of Noise Abatement Walls Near Roads—ZTV-Lsw 06). Improved absorption values can of course also be achieved in the range of less than 500 Hz as well as in the range of 3000 Hz through appropriate arrangements and combinations of a plurality of different sound-proofing profiles with different distances from one another.

The embedding of sound-proofing profiles into an absorbent material of the absorbent layer according to the invention surprisingly leads to a definite increase in the overall degree of absorption. This is significant for use of the sound-absorbing construction components in noise abatement walls.

The absorbent layer and the backing layer are especially preferably adjacent to one another without leaving any cavities in between, optionally with an adhesive layer in between if the absorbent layer and the backing layer are glued together.

For example, the absorbent layer consists of expanded glass granules that already naturally have a high degree of absorption, for example, in the range of $\alpha$=0.8-1.0. However, other materials with a good or moderate absorption capacity may also be used.

For the connection between the backing layer that is optionally provided and the absorbent layer, in addition to the adhesive bond already mentioned, other auxiliary means and connecting means may also be used, in particular holding clamps, frame elements or mechanical connecting elements, such as those with which those skilled in the art are familiar.

In a modified embodiment, the absorbent layer instead has a degree of absorption $\alpha$=0.3-0.65. Nevertheless, high total absorption values can be achieved for the entire sound-absorbing construction component with the help of the embedded sound-proofing profiles.

Modified embodiments may use materials that do not absorb sound as well. The absorbent layer may be planar on its sound inlet surface, which faces the sound source or may have a profiling if this has been official for the respective intended purpose. However, high total absorption values can also be achieved with a planar surface.

The sound-proofing profile is preferably manufactured from steel plate or zinc plate with a thickness of less than 1 mm or some other hard material, for example, plastic or fiber cement.

The backing layer that is optionally provided especially preferably consists of a material that is not sound absorbent but has a high load bearing capacity, for example, concrete or masonry. However, materials with a low degree of absorption are also suitable for the backing layer in modified embodiments.

When using the sound-absorbing construction components described here, the present invention also proposes a noise abatement wall which is characterized in that it has a backing layer to which a plurality of sound-absorbing construction components according to the invention is attached. Supporting constructions for holding and/or connecting the individual sound-absorbing construction components may be used in the traditional manner.

The absorbent layer is preferably between 5 and 10 cm thick. The connection of the sound-absorbing construction component to a backing layer to create a noise abatement wall preferably has a total thickness between 8 and 12 cm.

BRIEF DESCRIPTION OF THE DRAWINGS

Additional advantages, details and refinements of the present invention are derived from the following description of preferred specific embodiments with reference to the drawings, in which.

DETAILED DESCRIPTION OF THE INVENTION

Figure 1:
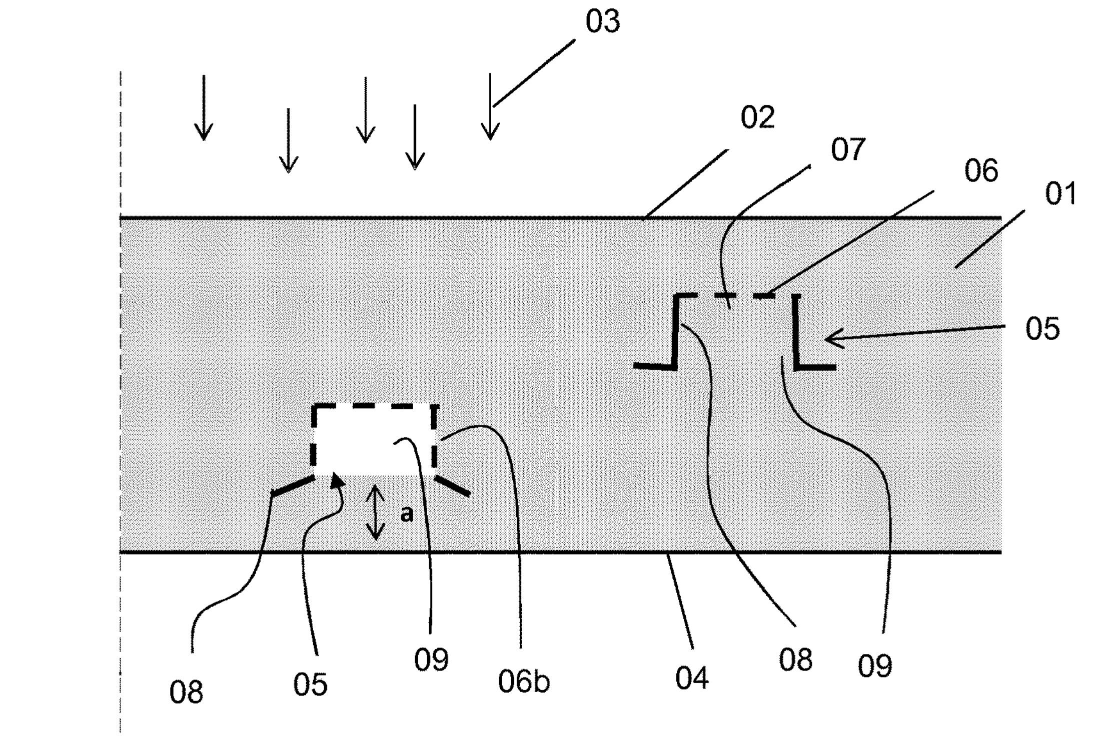
FIG. 1 shows a cross-sectional view of a first embodiment of the sound-absorbing construction component according to the invention having an absorbent layer.

FIG. 1 shows a first embodiment of a sound-absorbing construction component in a simplified cross-sectional view. In this embodiment the sound-absorbing construction component includes an absorbent layer 01 made of a sound-absorbing material, for example, with a degree of absorption $\alpha$=0.3-0.65. The absorbent layer 01 is designed over the full area and in practice has a thickness of 60 mm, for example. The absorbent layer has a sound inlet surface 02 through which sound waves 03 can enter. Furthermore, the absorbent layer 01 has a back side 04 which is preferably opposite and parallel to the sound entrance surface. A plurality of sound-proofing profiles 05 surrounded completely by the material of the absorbent layer is incorporated into the absorbent layer 01. Each sound-proofing profile 05 consists of a sound-reflecting material, for example, thin sheet metal, plastic or the like. The sound-proofing profile 05 has at least one open side and preferably has one or more inlet surfaces 06 having numerous sound inlet openings 07.

The inlet surface 06 runs parallel to the sound inlet surface 02 of the absorbent layer 01 in the sound-proofing profile shown at the right of FIG. 1 but may also form an angle to the sound inlet surface. With the sound-proofing profile shown at the left of FIG. 1, a first inlet surface runs parallel to the sound inlet surface 02, and second inlet surfaces **06*b*** run at a right angle to the first inlet surface.

In addition, the sound-proofing profile 05 preferably has at least one closed reflective surface 08 which is connected to the inlet surface 06. The reflective surface 08 may run, for example, at approximately a right angle to the sound inlet surface 02 of the absorbent layer 01 (profile at the right of FIG. 1) or may also be designed as a collar surface which is parallel to the sound inlet surface 02 of the absorbent layer 01 (profile at the right of FIG. 1) or approximately at an angle of 45° to the sound inlet surface 02 (profile at the left in FIG. 1). The sound-proofing profile describes a profile interior 09 in cross section having a side that is open and facing away from the sound inlet surface. The profile interior space 09 may be hollow (profile at the left of FIG. 1) or may be filled entirely or partially with the material of the absorbent layer (profile at the right of FIG. 1). The sound-proofing profiles 05 may be arranged side-by-side in a plane or at a planar offset from one another (as shown in FIG. 1).

Figure 2:
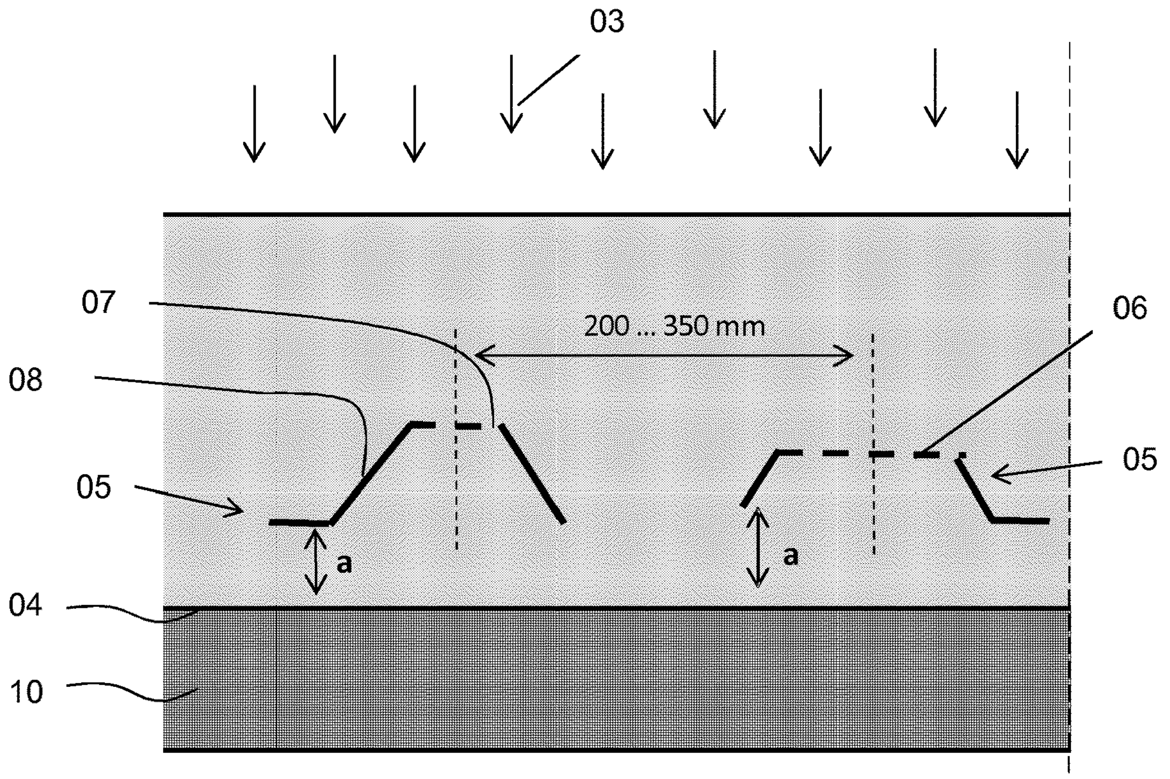
FIG. 2 shows a cross-sectional view of a second specific embodiment of the sound-absorbing construction component having an additional backing layer.

Different structural shapes of the sound-proofing profiles 05 are shown in FIGS. 1 and 2 as examples. Additional modifications, for example, curved or cylindrical cross sections of the sound-proofing profiles are also possible. FIG. 1 shows two U-shaped sound-proofing profiles 05, each of which has lateral collar surfaces 08, completely enclosed in the absorbent layer 01. The collar surfaces act as reflective surfaces 08 and also serve to provide the mechanical hold of the sound-proofing profiles in the absorbent layer.

FIG. 2 shows instead sound-proofing profiles with a cross section in the form of a truncated pyramid, the interior of each profile being filled with the material of the absorbent layer. These two profiles shown as examples each have a collar surface on only one side.

FIG. 2 also shows a backing layer 10 to which the absorbent layer 01 is applied. The backing layer 10 is made of a hard sound reflecting material.

The absorbent layer 01 especially preferably has a thickness of 50 to 70 mm, wherein a thickness of 60 mm is very suitable for manufacturing absorbent sheets, which are subsequently mounted on existing walls or the like, while thicknesses greater than 60 mm are suitable for construction of acoustic walls in particular.

The distance a between the back side 04 and the sound-proofing profiles preferably amounts to 15 to 25 mm. The lateral distance between the sound-proofing profiles preferably amounts to between 200 and 350 mm, based on their respective longitudinal axes.

Figure 3:
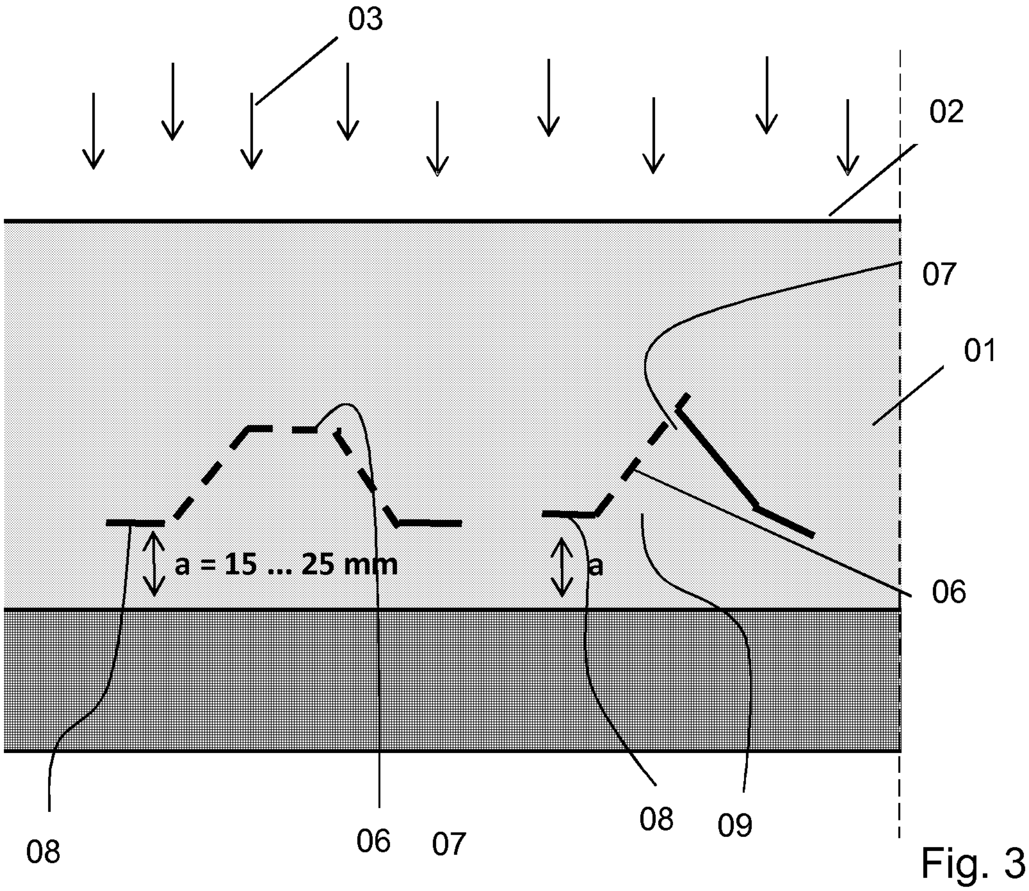
FIG. 3 shows a cross-sectional view of a third embodiment of the sound-absorbing construction component having a backing layer.

FIG. 3 shows yet another modified embodiment of the sound-absorbing construction component. The sound-proofing profile shown at the right there has an essentially triangular cross section with the inlet surface 06 being approximately at an angle of 45° to the sound inlet surface 02, a reflective surface 08 shaped as a collar surface running approximately parallel to the sound inlet surface 02 and another reflective surface 08 running approximately at an angle of 45° to the sound inlet surface 02. In the soundproofing profile shown at the left of FIG. 3, three inlet surfaces 06 are provided, two of them approximately at an angle of 45° to the sound inlet surface 02 with the reflective surface 08 shaped as a collar surface running approximately parallel to the sound inlet surface 02.

Figure 4:
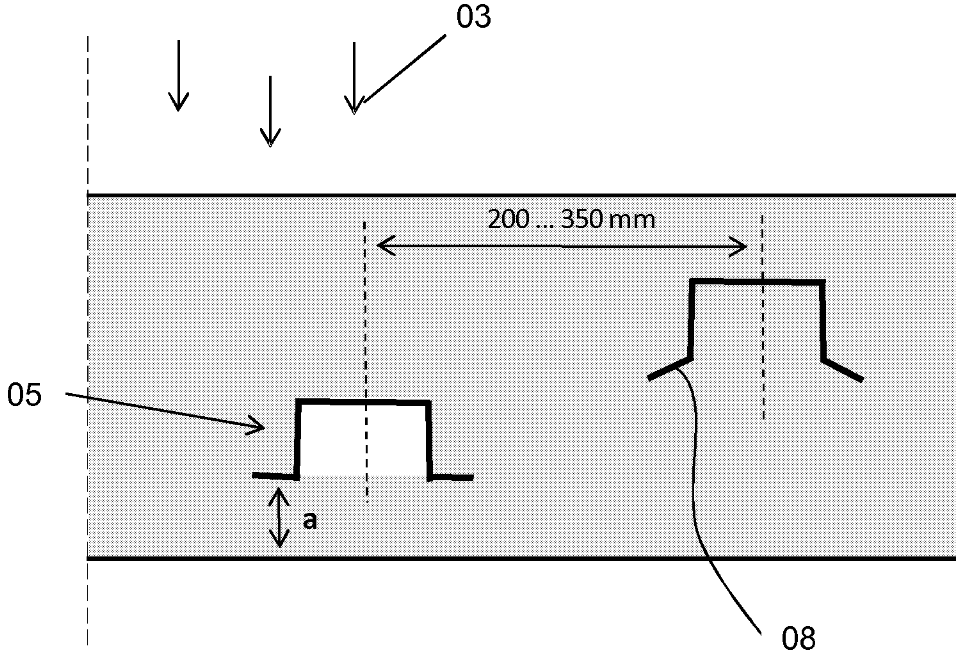
FIG. 4 shows a cross-sectional view of al fourth embodiment of the sound-absorbing construction component.

FIG. 4 shows an embodiment of the sound-absorbing construction component with a particularly simple design, wherein the sound-proofing profiles have an open side but do not have an inlet surface with perforations. The soundproofing profile shown at the right there has an essentially U-shaped cross section with the two-sided collar surfaces 08 lying approximately at an angle of 45° to the sound inlet surface 02 and all the surfaces of the profile acting as reflective surfaces. With the sound-proofing profile illustrated at the left in FIG. 4, the profile interior is hollow and the collar surfaces run approximately parallel to the sound inlet surface 02.

Figure 5:
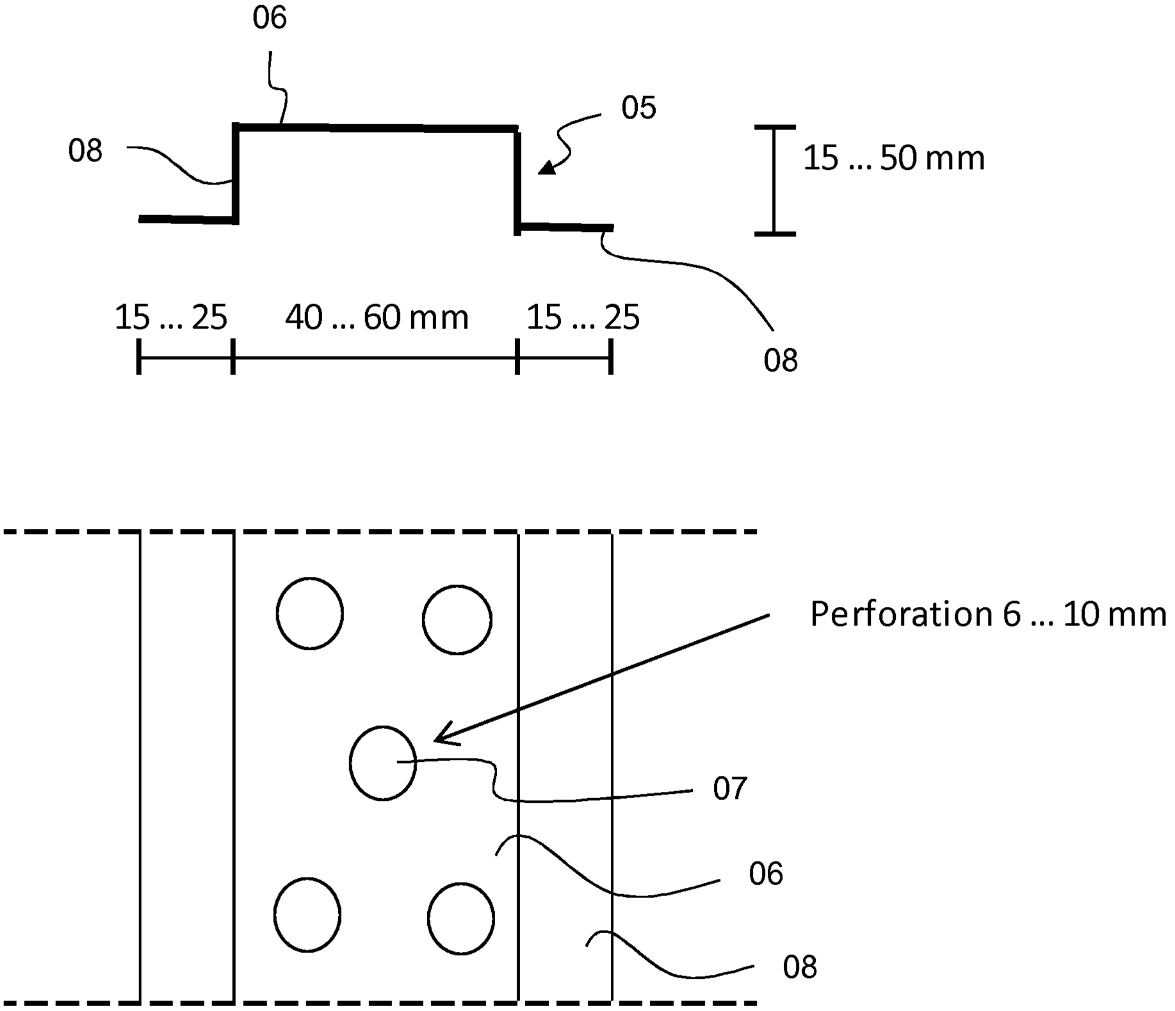
FIG. 5 shows two views of a sound-proofing profile with examples of dimensions.

Additional preferred dimensions of the sound-proofing profiles are given in FIG. 5, which shows an example of a sound-proofing profile 05 in both cross section and in a view from above.

FIGS. 6 through 9 show additional measurement curves of the absorption coefficient α as a function of frequency f, wherein the special effect of the construction components according to the invention is apparent from a comparison of the curves.

Figure 6:
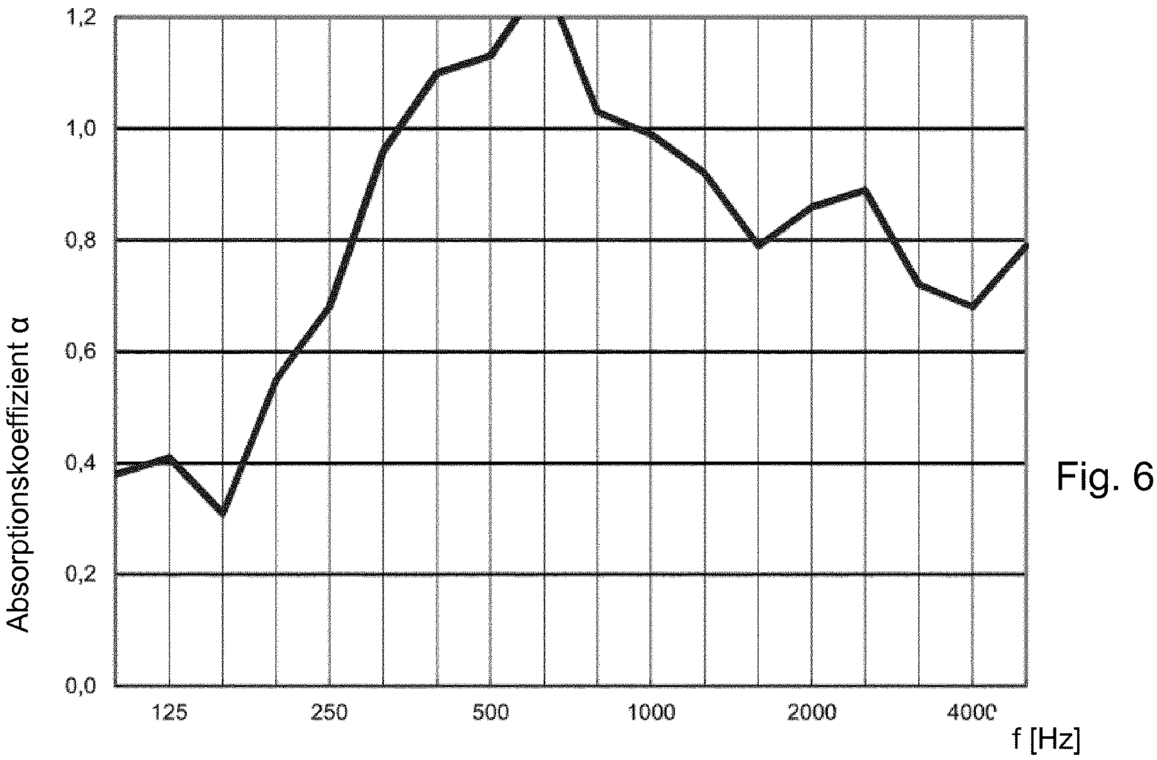
FIG. 6 shows a measurement curve of the absorption coefficient $\alpha_s$ as a function of the frequency f of an absorption layer made of expanded glass.
Figure 7:
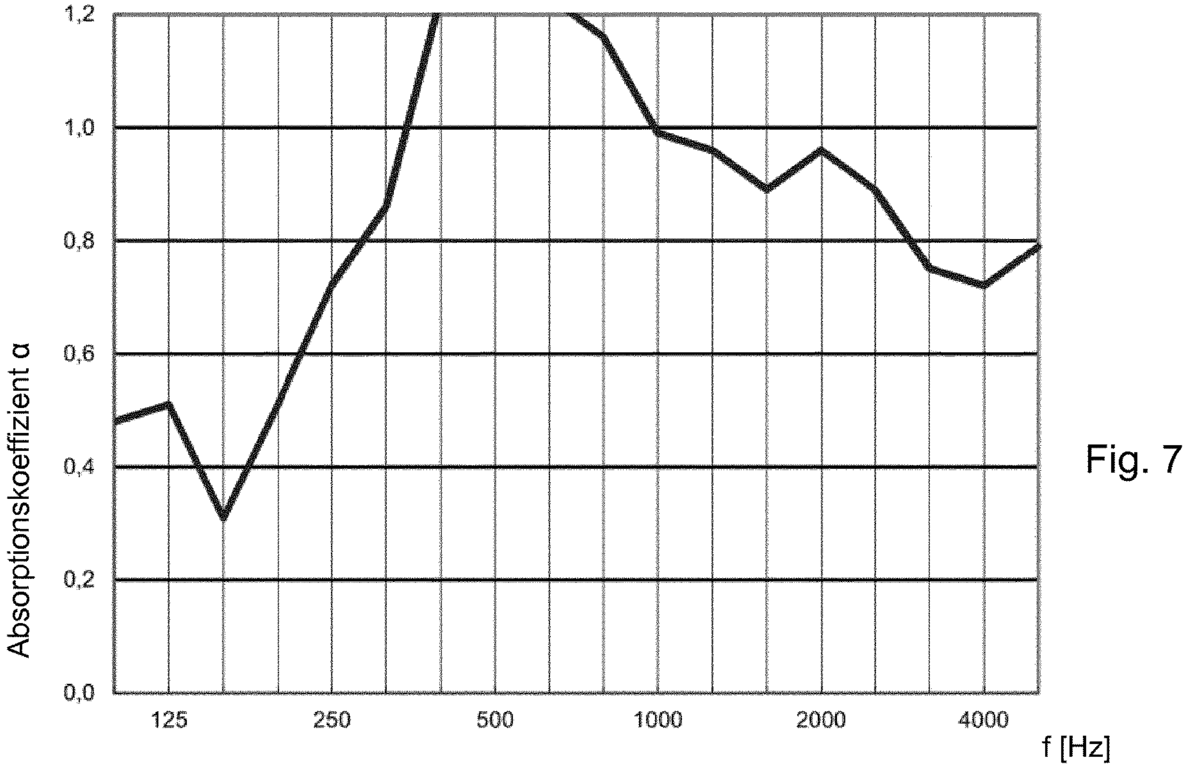
FIG. 7 shows a measurement curve of the absorption coefficient $\alpha_s$ as a function of the frequency f of an absorption layer made of expanded glass with sound-proofing profiles according to the present invention.

FIG. 6 shows a measurement curve of the absorption coefficient α as a function of the frequency f of an absorbent layer made only of expanded glass (grain size 1-2 mm) with a layer thickness of 60 mm. When evaluated according to EN 1793-1, this yields a damping of 11.3 dB in this case. In comparison with that, FIG. 7 shows a measurement curve of the absorption coefficient α as a function of the frequency f of the same absorbent layer made of expanded glass, but in this case a plurality of sound-proofing profiles (made of sheet metal, hat-shaped cross section, hollow profile interior) are integrated into the absorbent layer in the manner described above. It can be seen that there is a definite increase in the absorption coefficient in particular in the frequency range from approx. 250 Hz to approx. 2000 Hz, so that the efficiency of the design according to the invention is proven. When evaluated according to EN 1793-1, a damping of 14.2 dB is obtained in the experimental setup according to FIG. 7, corresponding to an increase of 26%.

Figure 8:
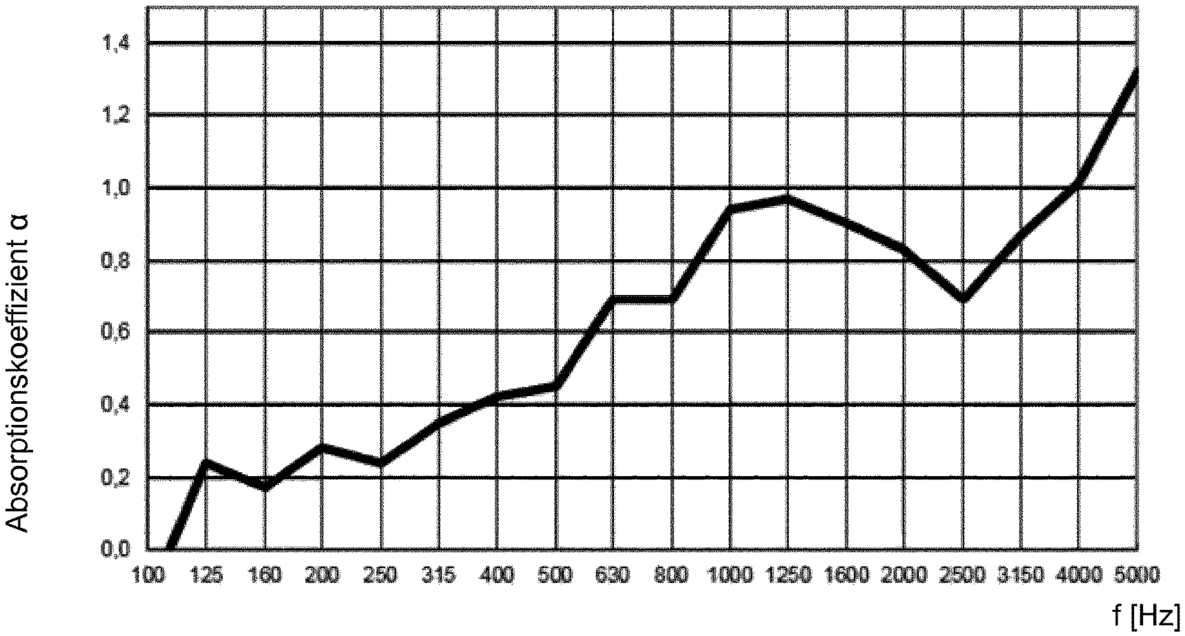
FIG. 8 shows a measurement curve of the absorption coefficient $\alpha_s$ as a function of the frequency f of an absorption layer made of expanded clay.
Figure 9:
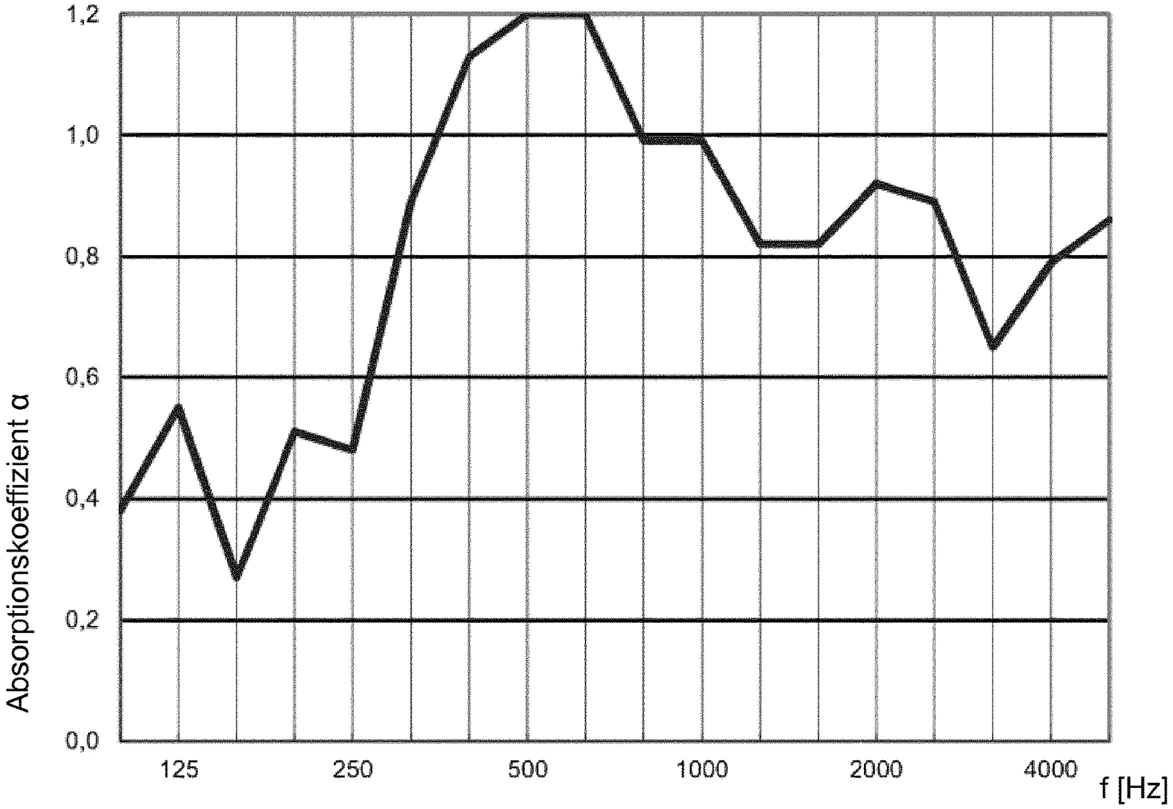
FIG. 9 shows a measurement curve of the absorption coefficient $\alpha_s$ as a function of the frequency f of an absorption layer made of expanded clay with sound-proofing profiles according to the present invention.

FIG. 8 shows a measurement curve for the absorption coefficient α as a function of frequency f of an absorbent layer made only of expanded clay (grain size 2-4 mm) with a layer thickness of 60 mm. When evaluated according to EN 1793-1, a damping of 6.2 dB is obtained in this case. In comparison with that, FIG. 9 shows a measurement curve of the absorption coefficient α as a function of frequency f of the same absorbent layer of expanded clay, but in this case a plurality of sound-proofing profiles (made of sheet metal, hat-shaped cross section, profile interior filled with expanded clay) is integrated into the absorbent layer in the manner described above. It can be seen that there is a definite increase in the absorption coefficient in particular in the frequency range from approx. 250 Hz to approx. 2000 Hz, so that the efficiency of the design according to the invention is proven. When evaluated according to EN 1793-1, a damping of 10.4 dB is found with the experimental setup according to FIG. 9, corresponding to a 68% increase.

Various applications can be constructed using the sound-absorbing construction components according to the invention. A preferred application is a noise abatement wall consisting of numerous sound-absorbing construction components.

Likewise, sound-absorbing construction components may also be used in vehicles, boats or aircraft. The sound-absorbing construction components may be shaped in various specific shapes for this purpose, for example, to conform to the contours of vehicle bodies.

The invention claimed is:

1. A sound-absorbing construction component, comprising a sound-absorbing absorbent layer having a sound inlet surface and a plurality of sound-proofing profiles arranged at a distance from one another and completely enclosed in the absorbent layer, such that the sound-proofing profile consists of a sound-reflecting material and has a profile interior, which has one open side facing away from the sound inlet surface, characterized in that the profile interior is filled partially or completely with the material of the absorbent layer.

2. The sound-absorbing component according to claim 1, wherein the sound-proofing profile has at least one inlet surface with numerous sound inlet openings and at least one closed reflective surface connected to the inlet surface, such that the reflective surface and the open side of the sound-proofing profiles are spaced a farther distance apart from the sound inlet surface than the inlet surface.

3. The sound-absorbing component according to claim 2, wherein the inlet surface of the sound-proofing profile is spaced a distance away from and parallel to the sound inlet surface, and the inlet surface is connected at an angle to and on both sides of these reflective surfaces.

4. The sound-absorbing construction component according to claim 1, wherein the sound-proofing profile has at least one collar surface, which runs parallel or at an angle to the sound inlet surface and extends outside of the profile interior.

5. The sound-absorbing construction component according to claim 1, wherein the open side of the sound-proofing profiles is at a greater distance from the sound inlet surface than from the back side of the absorbent layer, which is opposite the sound inlet surface, such that the distance (a) from the back side of the absorbent layer is preferably between 15 and 25 mm.

6. The sound-absorbing construction component according claim 1, wherein the sound-proofing profile has a U-shaped, V-shaped, hat-shaped cross section or is in the form of a truncated pyramid.

7. The sound-absorbing construction component according to claim 1, wherein the sound inlet openings perforate the inlet surface and take up 5% to 20% of the inlet surface area.

8. The sound-absorbing construction component according to claim 1, wherein the absorbent layer has a thickness of 50 to 70 mm and is made of a porous absorber material, in particular expanded glass, expanded clay, pumice, crushed rock, wood-reinforced concrete, mineral fiber or a mixture of these materials.

9. The sound-absorbing construction component according to claim 1, wherein the profile interior has a cross-sectional area between 600 and 3000 mm2.

10. A noise abatement wall having a backing layer, wherein numerous sound-absorbing construction components according to claim 1 are attached to the backing layer.

* * * * *